United States Patent
Li

(10) Patent No.: US 8,793,981 B2
(45) Date of Patent: Aug. 5, 2014

(54) FUEL PROCESSOR WITH IMPROVED CARBON MANAGEMENT CONTROL

(75) Inventor: Xuantian Li, Richmond (CA)

(73) Assignee: Westport Power Inc., Vancouver, BC (CA)

( * ) Notice: Subject to any disclaimer, the term of this patent is extended or adjusted under 35 U.S.C. 154(b) by 244 days.

(21) Appl. No.: 13/088,963

(22) Filed: Apr. 18, 2011

(65) Prior Publication Data

US 2012/0036841 A1 Feb. 16, 2012

Related U.S. Application Data

(63) Continuation of application No. PCT/CA2009/001477, filed on Oct. 16, 2009.

(60) Provisional application No. 61/106,412, filed on Oct. 17, 2008.

(51) Int. Cl.
*F01N 3/00* (2006.01)

(52) U.S. Cl.
USPC .......................................................... 60/287

(58) Field of Classification Search
USPC .......................................... 60/274, 286, 311
See application file for complete search history.

(56) References Cited

U.S. PATENT DOCUMENTS

| | | | | | |
|---|---|---|---|---|---|
| 4,492,079 | A | * | 1/1985 | Takagi et al. | 60/274 |
| 4,567,725 | A | * | 2/1986 | Shinzawa et al. | 60/274 |
| 4,719,751 | A | * | 1/1988 | Kume et al. | 60/285 |
| 4,835,964 | A | * | 6/1989 | Kume et al. | 60/285 |
| 6,959,541 | B2 | * | 11/2005 | Kosaka et al. | 60/295 |
| 7,062,906 | B2 | * | 6/2006 | Otake et al. | 60/295 |
| 7,254,940 | B2 | * | 8/2007 | Saitoh et al. | 60/295 |
| 2006/0168951 | A1 | * | 8/2006 | Opris | 60/297 |
| 2008/0295486 | A1 | * | 12/2008 | Crowell et al. | 60/274 |

FOREIGN PATENT DOCUMENTS

GB  2012182 A * 7/1979 ............ B01D 45/12

* cited by examiner

*Primary Examiner* — Thomas Denion
*Assistant Examiner* — Matthew T Largi
(74) *Attorney, Agent, or Firm* — Corridor Law Group, P.C.

(57) ABSTRACT

A method of regenerating a particulate filter which traps particulate matter contained in a product stream of a fuel processor. The method comprises a step which predicts the value of a parameter indicative of carbon accumulation in the particulate filter during operation of the fuel processor. When the predicted value meets or exceeds a first threshold value a regeneration process is initiated. Optionally, after a certain time or when the predicted value meets or falls below a second threshold value, the regeneration process is ceased.

16 Claims, 6 Drawing Sheets

FUEL PROCESSOR WITH IMPROVED CARBON MANAGEMENT CONTROL

CROSS-REFERENCE TO RELATED APPLICATIONS

This application is a continuation of International Application No. PCT/CA2009/001477, having an international filing date of Oct. 16, 2009, entitled "Fuel Processor With Improved Carbon Management Control". The '477 international application claimed priority benefits, in turn, from U.S. Provisional Patent Application Ser. No. 61/106,412 filed on Oct. 17, 2008, entitled "Fuel Processor With Improved Carbon Management Control". The '477 international application and '412 provisional application are each hereby incorporated by reference herein in its entirety.

FIELD OF THE INVENTION

The present technology relates to a fuel processor for producing a hydrogen-containing gas stream, such as a syngas stream. The present method is particularly suitable for fuel processors where a particulate filter is employed at least partially within or downstream of the fuel processor to capture particulates in the hydrogen-containing gas stream.

BACKGROUND OF THE INVENTION

For engine systems in vehicular or other mobile applications where a supply of hydrogen is utilized, due to challenges related to on-board storage of a secondary fuel and the current absence of a hydrogen refueling infrastructure, hydrogen is preferably generated on-board using a fuel processor. The hydrogen-containing gas from the fuel processor can be used to regenerate, desulfate and/or heat engine exhaust aftertreatment devices, can be used as a supplemental fuel for the engine, and/or can be used as a fuel for a secondary power source, for example, a fuel cell. In some applications the demand for the hydrogen-containing gas produced by the fuel processor is highly variable.

One type of fuel processor is a syngas generator (SGG) that can convert a fuel reactant into a gas stream containing hydrogen ($H_2$) and carbon monoxide (CO), known as syngas. Air and/or a portion of the engine exhaust stream can be used as an oxidant reactant for the fuel conversion process. The exhaust stream typically contains oxygen ($O_2$), water ($H_2O$), carbon dioxide ($CO_2$), nitrogen ($N_2$) and sensible heat, which can be useful for the production of syngas. Steam and/or water can optionally be added. The fuel supplied to the SGG can conveniently be chosen to be the same hydrocarbon fuel that is used in the engine. Alternatively a different fuel can be used, although this would generally involve a separate secondary fuel source and supply system specifically for the SGG. The $H_2$ and CO can be beneficial in processes used to regenerate exhaust after-treatment devices. For other applications, for example, use as a fuel in a fuel cell, the syngas stream can be additionally processed prior to use.

The thermochemical conversion of a hydrocarbon fuel to syngas is performed in a SGG at high operating temperatures with or without the presence of a suitable catalyst. Parameters including equivalence ratio (ER) and operating (reaction) temperature are typically adjusted in an attempt to increase the efficiency of the fuel conversion process while reducing the undesirable formation of carbon (coke or soot), which can cause undesirable effects within the SGG and/or in downstream components. The term equivalence ratio (ER) herein refers to a ratio between the actual amount of oxygen supplied and the theoretical stoichiometric amount of oxygen which would fully react with the fuel present in the reactant mixture supplied to the SGG. An ER of greater than 1 represents a fuel lean mode (excess oxygen), while an ER of less than 1 represents a fuel rich mode (excess fuel). The term carbon herein includes solid fraction particulates of elemental carbon including graphitic carbon, coke and soot. Over time, carbon accumulation can impede the flow of gases, increase the pressure drop across the SGG and its associated components, and reduce the operating life or durability of the SGG. Large accumulations of carbon also have the potential to create excessive amounts of heat that can damage the SGG if the carbon is converted (for example, combusted or oxidized) in a short period of time.

While many have attempted to eliminate or reduce carbon formation, practically there is always a tendency for carbon to form during the conversion of the fuel into syngas. A particulate filter, also known as a particulate trap, soot filter or soot trap, can be employed within, at least partially within, or downstream of a fuel processor to collect or trap carbon from the product syngas stream. This allows for increased control and management of the particulates. The particulate filter can be, for example, a wall-flow monolith, a fibrous structure, a foam structure, a mesh structure, an expanded metal type structure or a sintered metal type structure. The particulate filter can be constructed from a suitable material, for example, ceramic materials, and may or may not contain one or more catalysts. Typically, carbon can be allowed to collect until the accumulation begins to adversely affect the gas flow across the particulate filter. A subsequent carbon removal process can be initiated to remove the carbon particulates collected by the particulate filter. The term "carbon gasification" herein includes one or a combination of combustion, oxidation, gasification or other carbon conversion processes by which carbon is removed. Methods to gasify carbon can include, for example, operating the SGG, at least periodically, with an increased equivalence ratio in a fuel lean mode or in a fuel rich mode within a desired temperature range. The equivalence ratio can be increased, for example, by reducing the mass flow of the fuel supply, turning the fuel supply off for a period of time, pulsating the mass flow rate of the fuel supply between a reduced and normal operating flow, or increasing the mass flow of the oxidant supply. Carbon gasification can occur in either fuel lean or fuel rich modes. An alternative approach to gasify carbon is to increase the atomic oxygen-to-carbon (O/C) ratio by adding a supplemental oxygen-containing reactant, for example, water can be introduced into the SGG. The carbon gasification process can be used to regenerate the filter in situ from time to time, and then it will continue to trap carbon particulates.

Prior methods to initiate and/or cease the regeneration process of a particulate filter include methods based on parameters that are indicative of carbon accumulation in the particulate filter, for example, sensing a pressure differential across (upstream and downstream of) the particulate filter, sensing a change in pressure upstream of the particulate filter, sensing a change in electrical conductivity near or within the particulate filter. Other methods are based on empirical results, for example, performing regeneration during predetermined operating conditions and sensing the elapsed time since previous regeneration. In applications where the fuel processor is subjected to highly variable and transient operating conditions and/or is less predictable, it can be advantageous to employ a regeneration scheme based on parameters that are indicative amounts of carbon accumulation in the particulate filter.

In vehicular or other mobile applications, an on-board SGG should generally be low cost, compact, light-weight, of low power consumption, efficiently packaged with other components of the engine system, and be of high reliability and high durability. Disadvantages of employing sensing devices for initiating and optionally ceasing a regeneration process of a particulate filter of a fuel processor include:

(a) the increase in quantity of components and their associated potential failure mechanisms, including reduced reliability and/or durability due to potential contamination and/or blockage of sensors, (b) the additional cost of sensors and associated hardware, (c) the increase in size, weight and power requirements of the SGG.

The present approach to improved carbon management control for a fuel processor is effective in reducing the requirement for sensing devices and addressing at least some of the issues discussed above, for fuel processors in engine system and other applications.

SUMMARY OF THE INVENTION

A method of operating a fuel processor to produce a product stream and regenerating a particulate filter which accumulates carbon from the product stream, comprises:

(a) supplying oxidant and fuel reactants to the fuel processor and controlling the equivalence ratio of the reactants supplied to the fuel processor, to produce a product stream that is directed to flow through the particulate filter;

(b) predicting, at least periodically, a value of a parameter indicative of carbon accumulation in the particulate filter during operation of the fuel processor;

(c) determining when the predicted value of the parameter meets a first threshold value, and (d) adjusting the equivalence ratio from a normal operating ER value to a filter regeneration ER value, when the predicted value of the parameter meets the first threshold value, so that the particulate filter is at least partially regenerated during this step.

The parameter in step (b) can be, for example, the carbon loading of the particulate filter or the pressure drop across the particulate filter.

The filter regeneration step is initiated in step (d). The method can further comprise stopping the filter regeneration step when a cease-regeneration condition is met. Thus, the equivalence ratio of reactants can be adjusted from the filter regeneration ER value to a normal operating ER value when a cease-regeneration condition is met. A cease-regeneration condition can comprise one or more of the following:

(i) that the elapsed time during which the fuel processor has been supplied with reactants at the regeneration ER value exceeds a threshold time value;

(ii) that a predicted value of a parameter indicative of carbon accumulation in the particulate filter meets a second threshold value;

(iii) that a predicted value of a parameter indicative of the rate of change of carbon accumulation in the particulate filter falls below a threshold rate value.

The steps in the above-described method can then be repeated so that subsequent filter regeneration steps are initiated and stopped in accordance with the method.

A fuel processing system comprising a fuel processor, a particulate filter for trapping particulates from a product stream of the fuel processor, and a subsystem for controlling regeneration of the filter. The subsystem comprises:

(a) at least one mass flow regulator to control the flow of at least one reactant stream supplied to the fuel processor;

(b) a controller operatively coupled to the at least one mass flow regulator;

wherein the controller predicts, at least periodically, the value of a parameter indicative of carbon accumulation in said particulate filter, and the controller actuates said at least one mass flow regulator when said predicted value meets or exceeds a first threshold value so that said fuel processor is operated with an increased equivalence ratio.

The parameter can be, for example, the carbon loading of the particulate filter or the pressure drop across the particulate filter.

The controller can further determine when a cease-regeneration condition is met and actuate the mass flow regulator to provide an equivalence ratio for a normal operating condition of the fuel processor when the cease-regeneration condition is met, so that the regeneration process is stopped. In this case the controller can, for example, determine:

(a) when the elapsed time during which the fuel processor has been supplied with reactants at the regeneration ER value exceeds a threshold time value; and/or (b) when predicted value of a parameter indicative of carbon accumulation in the particulate filter meets a second threshold value; and/or (c) when a predicted value of a parameter indicative of the rate of change of carbon accumulation in the particulate filter falls below a threshold rate value.

In preferred embodiments, the fuel processing system is part of an engine system. The engine system can be part of a vehicle.

DETAILED DESCRIPTION OF PREFERRED EMBODIMENT(S)

Figure 1:
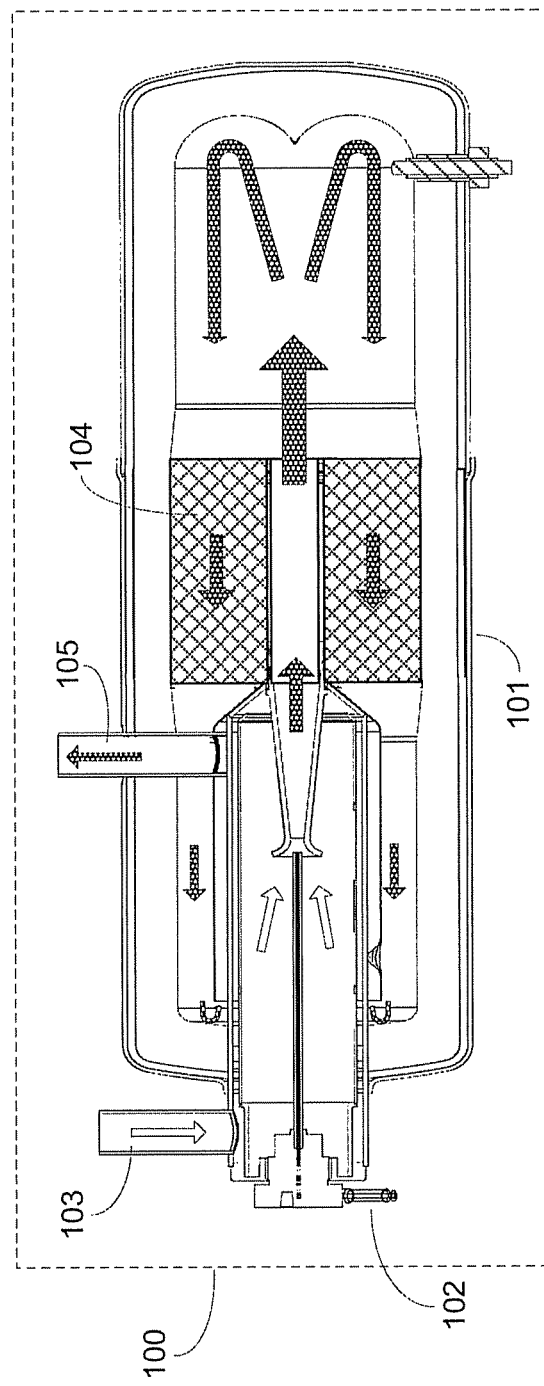
FIG. 1 is a cross-sectional drawing of an embodiment of a syngas generator (SGG) with a particulate filter located within the syngas generator.

FIG. 1 is a cross-sectional drawing of an embodiment of a syngas generator (SGG) with a particulate filter located within the syngas generator. The arrows are indicative of the general direction of flow of various streams within SGG 100. A fuel reactant stream (not shown in FIG. 1) is metered, or regulated, and introduced into SGG 100 via fuel inlet port 102, while an oxidant reactant stream (not shown in FIG. 1) is introduced into SGG 100 via oxidant inlet port 103. The fuel and oxidant reactant streams are metered or regulated, mixed, and converted to form a product stream which eventually exits the fuel processor. Upstream of the outlet port, the composition of the gas mixture passing through the fuel processor will generally be changing. This gas mixture of variable composition (resulting from partial or full conversion of the reactants) is herein referred to as a "product stream." Typically the product stream comprises syngas as well as, in some cases, unreacted or partially reacted fuel and oxidant streams. The product stream is directed to particulate filter 104, trapping particulates in the stream before it exits SGG 100 via syngas outlet port 105. Particulate filter 104 is located within shell 101, downstream of oxidant inlet port 103 and upstream of syngas outlet port 105. Alternatively, particulate filter 104 can be located external to shell 101, fluidly connected to receive the product stream downstream of SGG 100.

By metering or regulating the flow of one or more of the SGG reactants and adjusting the equivalence ratio (ER) of the reactants a SGG may be operated in a so-called "fuel rich mode" or a "fuel lean mode" or stoichiometrically. When the SGG is operating stoichiometrically both reactants are largely consumed in combustion processes. If excess fuel is supplied (ER <1) then the syngas generator will be operating in a fuel rich mode, with most of the oxidant being consumed. Similarly if excess oxidant is supplied (ER >1) then the syngas generator will be operating in a fuel lean mode, with most of the fuel being consumed by combustion. During the regeneration process of a particulate filter, the reactant supply can be adjusted to create a fuel lean mode, which gasifies carbon accumulated in the particulate filter. Under certain operating conditions, the reactant supply can be adjusted to increase the equivalence ratio, while maintaining a fuel rich mode and allowing the carbon gasification process to occur. The carbon gasification process can occur in a fuel lean or fuel rich mode. This allows the product stream to carry the gasified carbon out of the SGG. One or more regulators can be employed to meter each individual reactant stream supplied to the SGG. The regulator(s) can include mass flow meters, as well as other suitable flow control devices. The regulator(s) can be actively controlled with a controller, and can be located within and/or external to the SGG. The controller can employ pre-programmed methods, in communication with sensors to determine, monitor and adjust the ER. Alternatively, a passive flow control device can be used to meter one or more of the reactant streams supplied to the SGG.

In a preferred embodiment, a method predicts carbon accumulation in a particulate filter of a fuel processor. The method reduces the requirement for sensing devices, for example, pressure sensor(s). This can reduce the cost, size, weight and power consumption while increasing the reliability and durability of the fuel processor. The method includes:

(a) determining a predicted carbon loading in a particulate filter, for example, an integral of a predicted carbon loading rate that can be the net difference between:
  i) predicted carbon production rate during operation of the fuel processor,
  ii) predicted carbon removal rate during operation of the fuel processor,
and optionally,
(b) determining a predicted pressure drop of a particulate filter during operation of a fuel processor based on a cumulative sum of:
  iii) a predicted pressure drop value of a "baseline" particulate filter, and
  iv) a predicted increase in the pressure drop value across the particulate filter when it has an accumulation of carbon based on the predicted carbon loading determined in step (a).

In some applications, for example, motive or vehicular applications, practical methods to directly measure the carbon accumulation or loading during operation of a fuel processor are limited. However, carbon loading in a particulate filter can be predicted, for example, as an integral of the rates at which carbon will be produced and removed (or gasified) over time, as illustrated in equation (4). The term predicted carbon loading rate refers to the net difference between the carbon production and removal rates over a period of time, as illustrated in equation (1).

$$r_{cload} = r_{cprod} - r_{cred} \tag{1}$$

where:
$r_{cload}$=predicted carbon loading rate,
$r_{cprod}$=predicted rate of carbon production by a fuel processor during a time period of operation (say, $\Delta t$), as further detailed in equation (2),
$r_{cred}$=predicted rate of carbon removal by a fuel processor during a time period of operation (say, $\Delta t$), as further detailed in equation (3).

The units of $r_{cload}$, $r_{cprod}$ and $r_{cred}$ can be, for example, g/s or g/L·s.

The predicted rate at which carbon is produced during operation of a fuel processor is a function of various parameters as illustrated in equation (2).

$$r_{cprod} = f(m_{ox}, [O_2], T_{pox}, ER) \tag{2}$$

where:
$m_{ox}$=mass flow of oxidant reactant supplied to fuel processor,
$[O_2]$=oxygen concentration of oxidant reactant supplied to fuel processor,
$T_{pox}$=reaction temperature, for example, measured near inlet to particulate filter, and
ER=equivalence ratio of reactants supplied to fuel processor.

The predicted rate at which carbon is removed during operation of a fuel processor is a function of various parameters as illustrated in equation (3).

$$r_{cred} = f(m_c, [O_2]_{res}, [H_2O], A_{filt}, A_{filt}, T_{pox}) \tag{3}$$

where:
$[O_2]_{res}$=residual oxygen concentration in a product stream in the particulate filter
$[H_2O]$=concentration of water in a product stream in the particulate filter and
$A_{filt}, A_{filt}$=total filtration area of the particulate filter.

The carbon loading or carbon accumulation in a particulate filter can be predicted as illustrated in equation (4).

$$m_c^{(t)} = \max[0, m_c^{(t-\Delta t)} + (r_{cload})\Delta t] \quad (4)$$

where:
$m_c$=carbon loading (for example, in g or g/L),
t=current point in time, and
$\Delta t$=time interval between current point in time and previous recorded point in time.

An example of a predicted pressure drop across a particulate filter during operation of a fuel processor is illustrated in equation (5).

$$\Delta P_{filt} = \Delta P_0 + \Delta P_c \quad (5)$$

where:
$\Delta P_{filt}$=a predicted pressure drop across the particulate filter,
$\Delta P_0$=a predicted pressure drop of a baseline particulate filter (description below), and
$\Delta P_c$=a predicted increase in pressure drop across the filter due to an accumulation of carbon in a particulate filter.

A baseline particulate filter or particulate filter at a baseline condition signifies a particulate filter immediately following an effective regeneration process, which may or may not differ from a new or "clean" filter. The predicted pressure drop of across a particulate filter at a baseline condition during operation of a fuel processor is a function of various parameters as illustrated in equation (6).

$$\Delta P_0 = f(m_{ox}, m_F, T_{pox}, A_{filt}, A_{filt}, P_{filtout}) \quad (6)$$

where:
$m_F$=mass flow of fuel reactant supplied to fuel processor, and
$P_{filtout}$=back pressure of the fuel processor or pressure of the product stream immediately downstream of the particulate filter.

The increase in pressure drop across a filter due to an accumulation of carbon in the filter is a function of various parameters as illustrated in equation (7).

$$\Delta P_c = f(m_c, V_{filt}, A_{filt}, m_F, T_{pox}) \quad (7)$$

where:
$V_{filt}$=the volume of the particulate filter.

Figure 2:
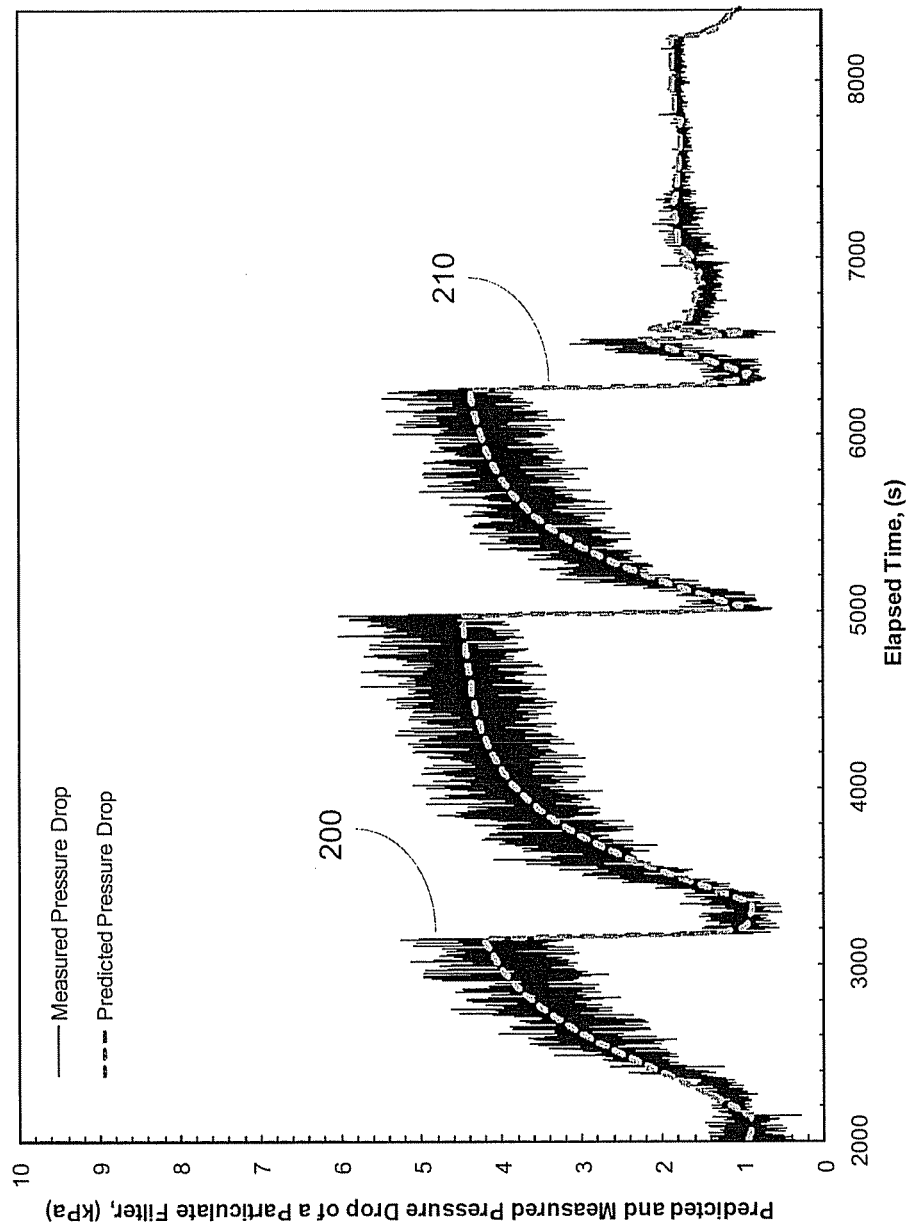
FIG. 2 is a chart illustrating a predicted and measured pressure drop across a particulate filter during operation of a syngas generator over elapsed time.

FIG. 2 is a chart illustrating the predicted and measured pressure drop across a particulate filter during operation of a syngas generator over elapsed time. Solid line 200 is a plot of a measured pressure drop across a particulate filter, while dashed line 210 is a plot of a predicted pressure drop across the particulate filter determined by employing equation (5).

In other embodiments a controller predicts carbon accumulation in a particulate filter and is employed to at least initiate and optionally cease a regeneration process of the particulate filter of a fuel processor. The predicted carbon accumulation in a particulate filter can be compared to pre-programmed threshold values, for example, a predicted carbon loading threshold and/or a predicted pressure drop threshold to initiate (first threshold value) or cease (second threshold value) the regeneration process. The first and second thresholds typically have different values. In some embodiments a first threshold is used to initiate regeneration and the regeneration step has a controlled or fixed duration. Alternatively, other measured parameters can be employed to cease the operation of the regeneration process, including for example, if the rate of change of carbon removal or pressure drop is below a predetermined rate.

Figure 3:
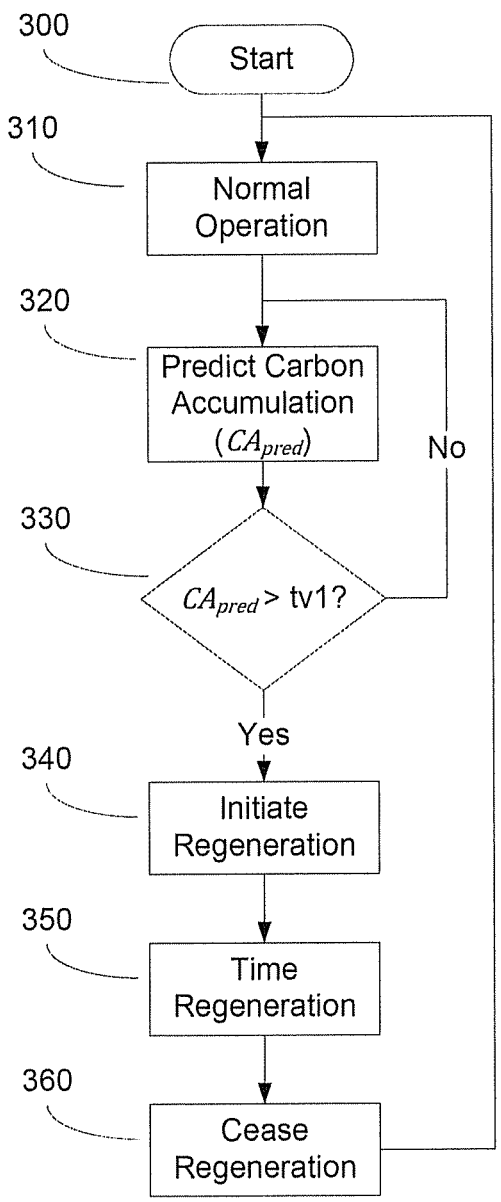
FIG. 3 is an embodiment of a method that can be used to initiate and cease a regeneration process of a particulate filter of a fuel processor. The regeneration process is initiated when a predicted carbon accumulation ($CA_{pred}$) in the particulate filter (for example, a predicted carbon loading, predicted carbon loading rate or a predicted pressure drop) exceeds a first threshold value, and the regeneration process ceases after the regeneration time has exceeded a predetermined value.

FIG. 3 illustrates an embodiment of a method that can be used to initiate and cease a regeneration process of a particulate filter of a fuel processor. The method starts with step 300, with the fuel processor activated. In step 310 the fuel processor is operating and the reactants are adjusted to a normal (or non-regenerating) operating mode. In step 320 carbon accumulation ($CA_{pred}$) in the particulate filter is predicted at least periodically, by predicting, for example, a predicted carbon loading rate as illustrated in equation (1), a predicted carbon loading as illustrated in equation (4), or a predicted pressure drop as illustrated in equation (5). In step 330, $CA_{pred}$ predicted in step 320 is compared to pre-programmed first threshold value (tv1) and if $CA_{pred}$ exceeds tv1, proceed to step 340; if $CA_{pred}$ does not exceed tv1, return and repeat step 320. In step 340 a regeneration process is initiated. This may include for example, adjusting the mass flow of the reactants in order to increase the ER and/or operating the fuel processor in a fuel-lean mode. In step 350, a timer is started at or near initiation of step 340 and the duration or elapsed time of the regeneration process is monitored. When the elapsed regeneration time reaches or exceeds a pre-programmed value, step 360 is initiated and the regeneration process is ceased. Normal operation is resumed in step 310, after completion of step 360. The regeneration control method can also be terminated when the controller receives a signal to shut down the fuel processor. Optionally, the regeneration process can be included in other operating processes for the fuel processor including, for example, a regeneration process can occur during a shutdown process of the fuel processor, or a regeneration process can occur when the fuel processor is at an idle condition (a condition where syngas output from the fuel processor may not be utilized).

Figure 4:
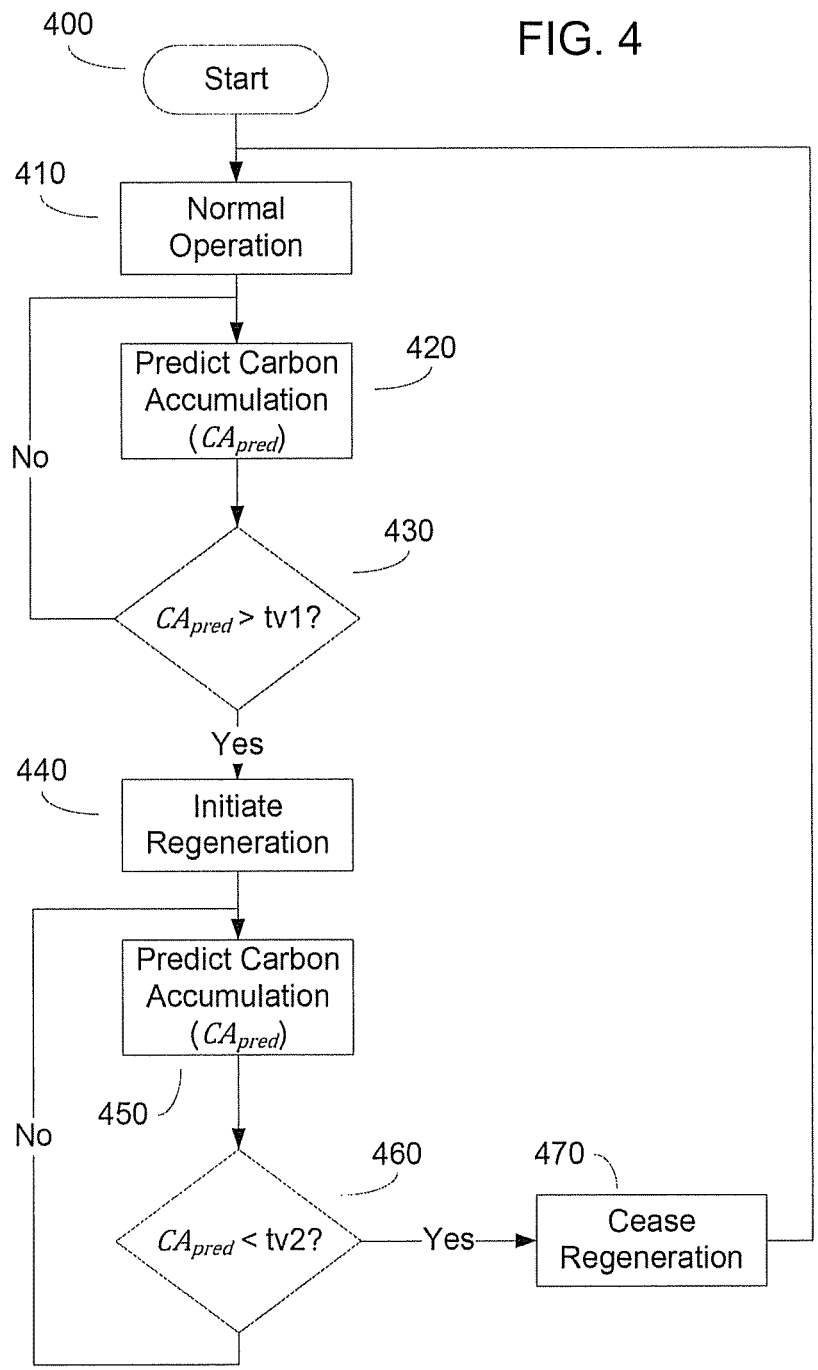
FIG. 4 is an embodiment of a method that can be used to initiate and cease a regeneration process of a particulate filter of a fuel processor. The regeneration process is initiated when a predicted carbon accumulation ($CA_{pred}$) in the particulate filter (for example, a predicted carbon loading, a predicted carbon loading rate or a predicted pressure drop) exceeds a first threshold value, and the regeneration process ceases when the predicted carbon accumulation falls below a second threshold value.

FIG. 4 illustrates an embodiment of a method that can be used to initiate and cease a regeneration process of a particulate filter of a fuel processor. The method starts with step 400, where the fuel processor is activated. In step 410 the fuel processor is operating and the reactants are adjusted to a normal (or non-regenerating) operating mode. In step 420, carbon accumulation ($CA_{pred}$) in the particulate filter is predicted at least periodically, by predicting, for example, a predicted carbon loading rate as illustrated in equation (1), a predicted carbon loading as illustrated in equation (4), or a predicted pressure drop as illustrated in equation (5). In step 430, $CA_{pred}$ is compared to a pre-programmed first threshold value (tv1). If $CA_{pred}$ determined in step 420 is not greater than tv1, return and repeat step 420. If $CA_{pred}$ determined in step 420 is greater than tv1, proceed to step 440, where a regeneration process is initiated. This may include for example, adjusting the mass flow of the reactants in order to increase the ER or increasing the ER such that the fuel processor is operating in a fuel-lean mode. In step 450 carbon accumulation ($CA_{pred}$) in the particulate filter is predicted at least periodically by predicting, for example, a predicted carbon loading rate as illustrated in equation (1), a predicted carbon loading as illustrated in equation (4), or a predicted pressure drop as illustrated in equation (5), and can optionally be the same predicted value employed in step 420. In step 460, $CA_{pred}$ is compared to a pre-programmed second threshold value. If $CA_{pred}$ determined in step 450 is not less than tv2, return and repeat step 450. If $CA_{pred}$ determined in step 450, is less than tv2, proceed to step 470 where the regeneration process is ceased. Normal operation is resumed in step 410 after step 470 is complete. The method can also be terminated when the controller receives a signal to shut down the fuel processor. Optionally, the regeneration process can be included in other operating processes for the fuel processor including, for example, a regeneration process can occur during a shutdown process of the fuel processor or a regeneration process can occur when the fuel processor is at idle condition (a condition where syngas output from the fuel processor is not utilized).

Figure 5:
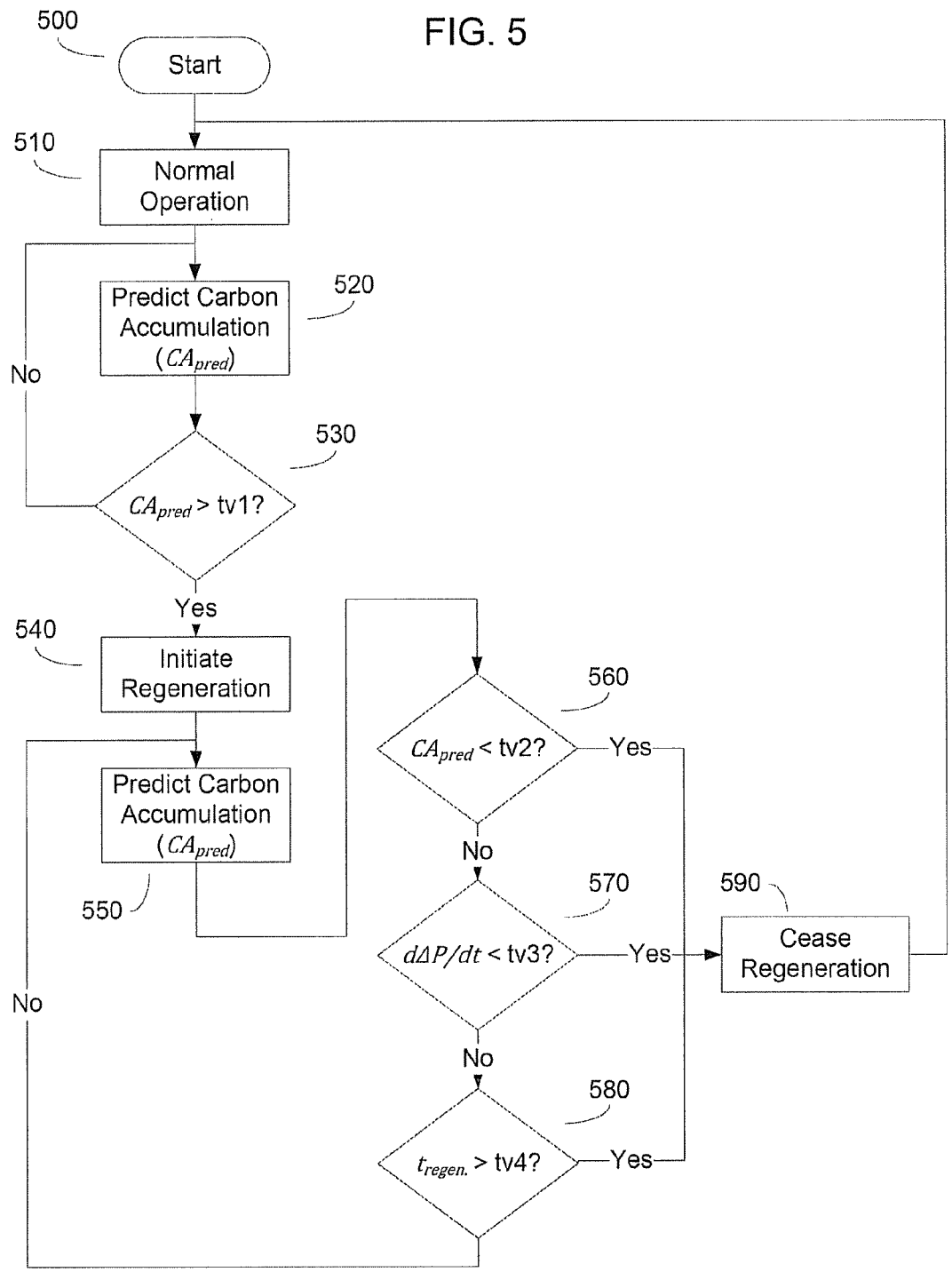
FIG. 5 is an embodiment of a method that can be used to initiate and cease a regeneration process of a particulate filter of a fuel processor. The regeneration process is initiated when a predicted carbon accumulation ($CA_{pred}$) in the particulate filter (for example, a predicted carbon loading, a predicted carbon loading rate or a predicted pressure drop) exceeds a first threshold value, and the regeneration process ceases when at least one of several conditions is met.

FIG. 5 illustrates a preferred embodiment of a method that can be used to initiate and cease a regeneration process of a particulate filter of a fuel processor. The method starts with step 500, where the fuel processor is activated. In step 510 the fuel processor is operating and the reactants are adjusted to a normal (or non-regenerating) operating mode. In step 520, carbon accumulation ($CA_{pred}$) in the particulate filter is predicted at least periodically by predicting, for example, a predicted carbon loading rate as illustrated in equation (1), a predicted carbon loading as illustrated in equation (4), or a predicted pressure drop as illustrated in equation (5). In step 530, $CA_{pred}$ is compared to a pre-programmed first threshold value (tv1). If $CA_{pred}$ determined in step 520 is not greater than tv1, return and repeat step 520. If $CA_{pred}$ determined in step 520 is greater than tv1, proceed to step 540, where a regeneration process is initiated. This may include for example, adjusting the mass flow of the reactants in order to increase the ER or increasing the ER such that the fuel processor is operating in a fuel-lean mode. In step 550, carbon accumulation ($CA_{pred}$) in the particulate filter is predicted at least periodically by predicting, for example, a predicted carbon loading rate as illustrated in equation (1), a predicted carbon loading as illustrated in equation (4), or a predicted pressure drop as illustrated in equation (5) and can optionally be the same predicted value employed in step 520. Optionally, other parameters can be monitored, predicted, stored and/or employed in steps 550 and 520, including for example, time intervals or times of prediction to determine the rate of change to the predicted values. In step 560, $CA_{pred}$ is compared to a pre-programmed second threshold value. If $CA_{pred}$ determined in step 550 is not less than tv2, proceed to step 570. If $CA_{pred}$ determined in step 550 is less than tv2, proceed to step 590. In step 570 the rate of change to $CA_{pred}$ is determined and compared to a pre-programmed third threshold value. If the rate of change to $CA_{pred}$ determined in step 570 is not less than tv3, proceed to step 580. If the rate of change to $CA_{pred}$ determined in step 570 is less than tv3, proceed to step 590. In step 580 the duration of regeneration is determined and compared to a pre-programmed fourth threshold value. If the duration of regeneration determined in step 580 is not greater than tv4, return and repeat step 550. If the duration of regeneration determined in step 580 is greater than tv4, proceed to step 590. Steps 560, 570 and 580, need not be executed in the sequence as illustrated in FIG. 5; they can be executed in any suitable sequence. Furthermore, one or more of the steps 560, 570 and 580 can be omitted or replaced with one or more other steps that compare some predicted or monitored parameter to a threshold value in order to determine whether the regeneration process should continue or cease.

In step 590 the regeneration process is ceased. This may include for example, adjusting the ER to a value determined by the controller. Normal operation is resumed in step 510 after step 590 is complete. The method can also be terminated when the controller receives a signal to shut down the fuel processor. Optionally, the regeneration process can be included in other operating processes for the fuel processor including, for example, a regeneration process can occur during a shutdown process of the fuel processor or a regeneration process can occur when the fuel processor is at idle condition (a condition where syngas output from the fuel processor is not utilized).

Figure 6:
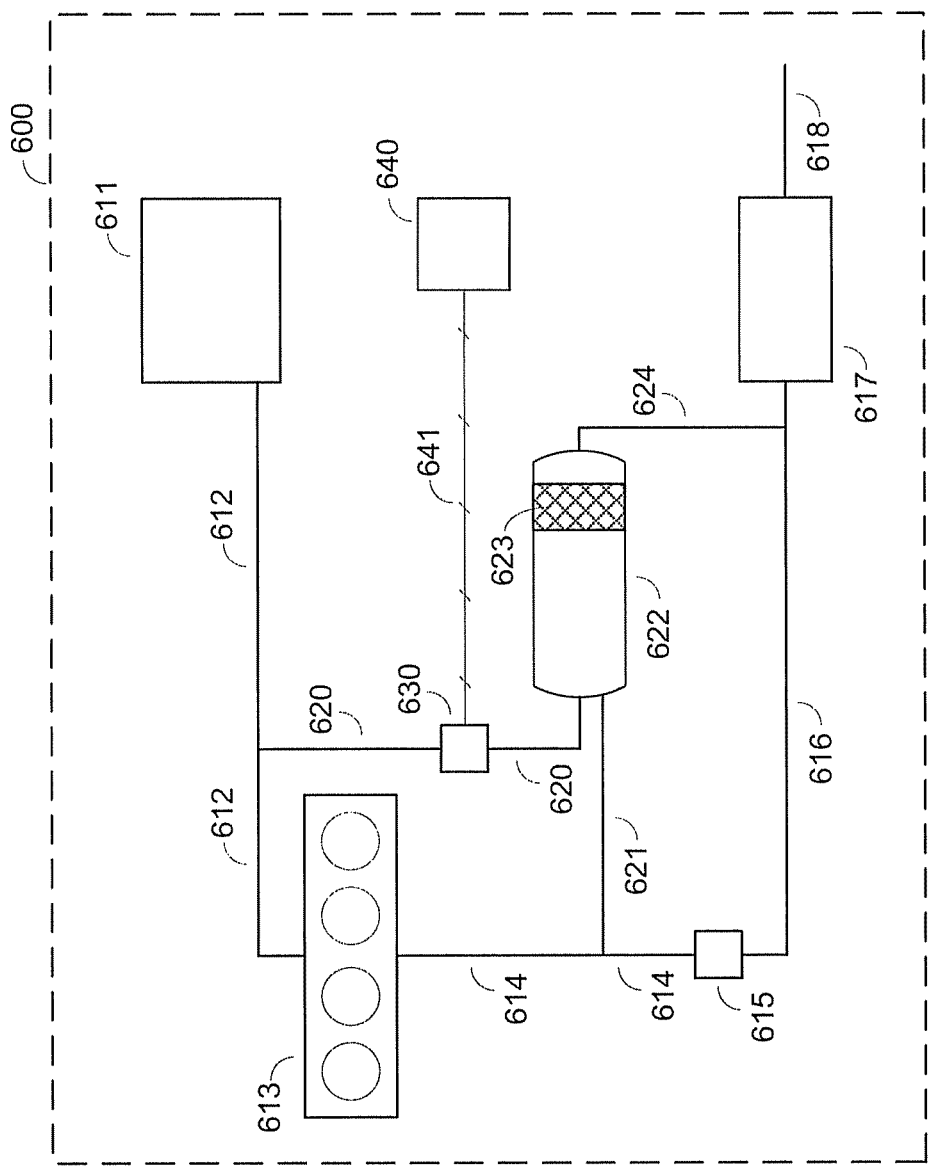
FIG. 6 is a schematic drawing of an embodiment of an engine system comprising a fuel processor with an internal particulate filter, an exhaust after-treatment system and a controller. The controller predicts at least one value that is indicative of carbon accumulation in the particulate filter to initiate and optionally to cease the regeneration process of the particulate filter.

FIG. 6 illustrates schematically an embodiment of an engine system 600 with a fuel processor and an exhaust after-treatment system. In the illustration the fuel processor is a syngas generator (SGG). In FIG. 6, fuel tank 611 supplies liquid fuel, through fuel supply line 612, to combustion engine 613. An optional fuel filter, fuel pump, fuel pressure regulating device and fuel flow control device (all not shown in FIG. 6) can be integrated into fuel tank 611, or into fuel supply line 612. An optional fuel return line (not shown in FIG. 6) can return fuel back to fuel tank 611. Combustion engine 613, could be a diesel, gasoline, liquefied petroleum gas (LPG), kerosene, natural gas, propane, methanol, ethanol, fuel oil, or other hydrocarbon, alcohol or suitably fueled engine of, for example, a compression ignition or spark ignition type. Combustion engine 613 can be of various designs including reciprocating piston, Wankel, and gas turbine. The engine can be part of a vehicular or non-vehicular system. The combustion engine typically comprises a conventional air supply subsystem (not shown in FIG. 6) to supply air to the engine.

Engine exhaust line 614 directs at least a portion of the engine exhaust stream to exhaust after-treatment subsystem 617, via optional turbo-compressor 615 and exhaust line 616. Engine exhaust line 614 and/or exhaust line 616 can incorporate other emissions reduction devices such as exhaust gas recirculation (EGR) systems (not shown in FIG. 6). Turbo-compressor 615 can contain an optional intercooler (not shown in FIG. 6). Exhaust after-treatment subsystem 617, can comprise various exhaust after-treatment devices such as Lean NOx Traps (LNTs), Diesel Particulate Filters (DPFs) for removing particulates from the engine exhaust stream, Diesel Oxidation Catalysts (DOCs), and a noise muffler and associated valves, sensors and controllers. The treated engine exhaust gas stream flows through exhaust pipe 618 and exits into the surrounding atmosphere.

In the illustrated embodiment, a portion of the engine exhaust stream from line 614 is directed to SGG 622, via SGG oxidant inlet line 621. Optionally, instead or as well as engine exhaust, air from an air supply sub-system, and/or water or steam from a steam supply sub-system (not shown in FIG. 6) can be introduced into SGG 622 via oxidant inlet line 621 and/or via one or more other inlets, at some points or continuously during operation of SGG 622. A passive flow control device, located within SGG 622 (not shown in FIG. 6) can be used to meter the oxidant reactant. Optionally, an actively controlled metering device (not shown in FIG. 6) which can receive signals from controller 640 can be integrated into line 621 or SGG 622. Fuel from fuel tank 611, is supplied from fuel supply line 612 to SGG 622 via SGG fuel inlet line 620 and fuel metering device 630. An optional fuel filter, fuel pump, fuel pressure regulating device, fuel pre-heater and/or fuel heat exchanger (all not shown in FIG. 6) can be integrated into SGG fuel inlet line 620.

SGG 622 converts the fuel and the oxidant streams, into a syngas stream. At least a portion of the syngas stream produced is supplied to syngas outlet line 624, via particulate filter 623 which is located within SGG 622. Particulate filter 623 collects carbon particulates from the product stream.

In FIG. 6 at least a portion of the syngas stream produced is supplied via syngas outlet line 624 to exhaust after-treatment subsystem 617. Syngas outlet line 624 can contain optional valves, sensors, controllers or similar equipment (not shown in FIG. 6). The syngas stream is used to regenerate, desulfate and/or to heat one or more devices in exhaust after-treatment subsystem 617, and can be directed to other hydrogen-consuming devices within the overall system, such as fuel cells (not shown) and/or to the engine itself.

A controller employs at least one method to control the reactant supply to SGG 622 and to initiate and optionally cease a regeneration process for particulate filter 623. The controller employs methods to predict carbon accumulation ($CA_{pred}$) in the particulate filter, for example, a predicted carbon loading as illustrated in equation (4), or a predicted pressure drop as illustrated in equation (5). Examples of suitable methods are illustrated in FIGS. 3, 4 and 5. Controller 640 alters the ER of SGG 622 by communicating with fuel metering device 630 via communication line 641, which adjusts the mass flow of the fuel reactant. Optionally, the fuel reactant supply can be controlled via a passive flow control device and the ER can be adjusted by metering the oxidant reactant with an actively controlled metering device, or supply of both the fuel and oxidant reactant streams can be actively controlled by metering devices which can be adjusted dependently or independently to control the ER.

The present predictive method could offer advantages in other types of fuel processors, reformers or reactors operating on different types of reactant mixtures. For example, the fuel processor could be of various types, such as a catalytic partial oxidizer, a non-catalytic partial oxidizer, and/or an autothermal reformer.

While particular elements, embodiments and applications of the present technology have been shown and described, it will be understood, that the invention is not limited thereto since modifications can be made by those skilled in the art without departing from the scope of the present disclosure, particularly in light of the foregoing teachings.

What is claimed is:

1. A method of operating a fuel processor to produce a product stream and regenerating a particulate filter which accumulates carbon from said product stream, said method comprising:
   (a) supplying oxidant and fuel reactants to said fuel processor and controlling an equivalence ratio of said reactants supplied to said fuel processor, to produce a product stream that is directed to flow through said particulate filter;
   (b) predicting, at least periodically, a value of a parameter indicative of carbon accumulation in said particulate filter during operation of said fuel processor as a function of a predicted carbon loading rate over a period of time;
   (c) determining when said predicted value of said parameter meets a first threshold value; and
   (d) adjusting said equivalence ratio from a normal operating equivalence ratio value to a filter regeneration equivalence ratio value, when said predicted value of said parameter meets said first threshold value, so that said particulate filter is at least partially regenerated.

2. The method of claim 1 wherein said parameter is the carbon loading of said particulate filter.

3. The method of claim 1 wherein said parameter is the pressure drop across said particulate filter.

4. The method of claim 1 further comprising adjusting said equivalence ratio of reactants from said filter regeneration equivalence ratio value to a normal operating equivalence ratio value when a cease-regeneration condition is met.

5. The method of claim 4 wherein said cease-regeneration condition comprises at least one of:
   (i) that the elapsed time during which the fuel processor has been supplied with reactants at said regeneration equivalence ratio value exceeds a threshold time value;
   (ii) that a predicted value of a parameter indicative of carbon accumulation in said particulate filter meets a second threshold value;
   (iii) that a predicted value of a parameter indicative of the rate of change of carbon accumulation in said particulate filter falls below a threshold rate value.

6. The method of claim 1 wherein said product stream comprises syngas.

7. The method of claim 1 wherein said particulate filter is located within said fuel processor.

8. A fuel processing system comprising a fuel processor, a particulate filter for trapping particulates from a product stream of said fuel processor, and a subsystem for controlling regeneration of said filter, said subsystem comprising:
   (a) at least one mass flow regulator to control the flow of at least one reactant stream supplied to said fuel processor;
   (b) a controller operatively coupled to said at least one mass flow regulator;
   wherein said controller predicts, at least periodically, a value of a parameter indicative of carbon accumulation in said particulate filter as a function of a predicted carbon loading rate over a period of time, and said controller actuates said at least one mass flow regulator when said predicted value meets or exceeds a first threshold value so that said fuel processor is operated with an increased equivalence ratio.

9. The fuel processing system of claim 8 wherein said parameter is the carbon loading of said particulate filter.

10. The fuel processing system of claim 8 wherein said parameter is the pressure drop across said particulate filter.

11. The fuel processing system of claim 8 wherein said controller actuates said at least one mass flow regulator to provide an equivalence ratio for a normal operating condition of said fuel processor when said controller determines that a cease-regeneration condition is met.

12. The fuel processing system of claim 11 wherein said cease-regeneration condition comprises at least one of:
   (i) that the elapsed time during which the fuel processor has been supplied with reactants at said regeneration equivalence ratio value exceeds a threshold time value;
   (ii) that a predicted value of a parameter indicative of carbon accumulation in said particulate filter meets a second threshold value;
   (iii) that a predicted value of a parameter indicative of the rate of change of carbon accumulation in said particulate filter falls below a threshold rate value.

13. The fuel processing system of claim 8 wherein said particulate filter is located within said fuel processor.

14. The fuel processing system of claim 8 wherein said fuel processor is a syngas generator.

15. The fuel processing system of claim 8 wherein said fuel processor system is part of an engine system.

16. The fuel processing system of claim 15 wherein said engine system is part of a vehicle.

* * * * *